Oct. 29, 1929.   S. V. C. SCRUBY   1,733,560
AUTOMATIC BATTERY CHARGING SYSTEM
Filed July 10, 1925
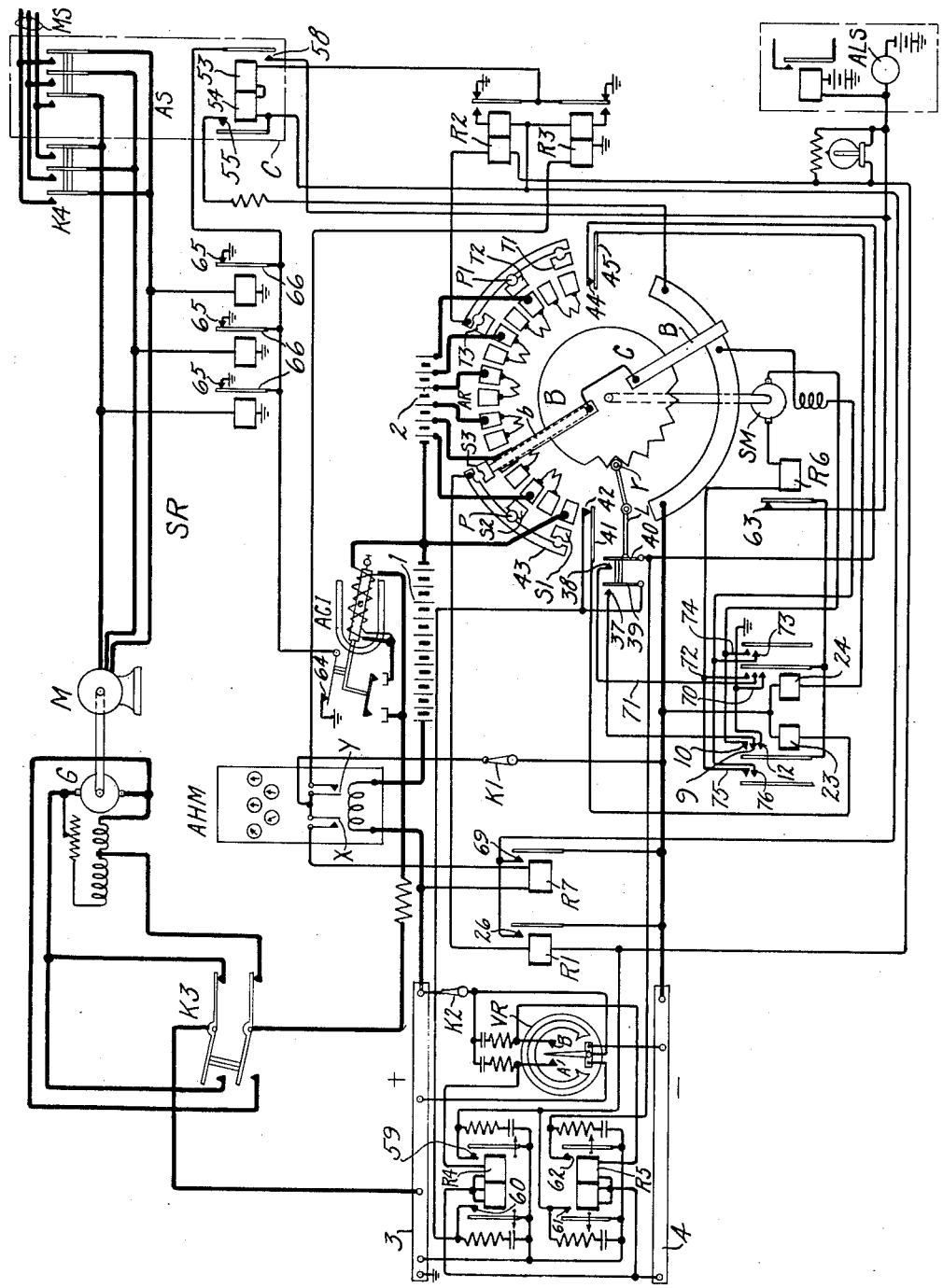
Inventor:
Sydney V. C. Scruby
by E. W. Adams  Atty.

Patented Oct. 29, 1929

1,733,560

UNITED STATES PATENT OFFICE

SYDNEY V. C. SCRUBY, OF ANTWERP, BELGIUM, ASSIGNOR TO WESTERN ELECTRIC COMPANY, INCORPORATED, OF NEW YORK, N. Y., A CORPORATION OF NEW YORK

AUTOMATIC BATTERY-CHARGING SYSTEM

Application filed July 10, 1925, Serial No. 42,654, and in Great Britain July 18, 1924.

This invention relates to arrangements for charging and regulating the voltage of secondary batteries, and is particularly applicable for use in connection with the power plants of small automatic telephone exchange systems.

In accordance with the present invention, an arrangement for automatically charging a secondary battery from an electrical generator comprises means whereby the charging operation is controlled jointly by the voltage of, and by the amount of energy taken from, or put into, the battery.

Preferably a device automatically cuts in or out of the battery circuit cells of a counter-electromotive force battery in accordance with the voltage of the secondary battery, adjustable means being provided operating when a particular cell or cells of the counter electromotive force battery is reached to effect the starting, and/or the stopping of, the charging operation.

In accordance with a further feature of the invention a signal device, which may be located at a distant point, such as in a main exchange, is operated in response to means actuated upon the failure of the power supply, and further, this signal device may also be operated upon the failure of a switch connecting generator to the battery and/or upon the failure of the driving means of the switch controlling the connection of the cells of the counter-electromotive force battery. Also the alarm signal in the main exchange is given if the high and low voltage condition is not connected.

The invention will be more fully understood from the following description taken in connection with the accompanying drawing which shows, by way of example, the circuit connections of an arrangement in accordance with the present invention.

In the drawing 1 is the main battery, while 2 constitutes a group of counter-electromotive force cells, preferably 7 in number, which are cut in and out by means of an automatic switching arrangement AR driven by a motor SM. 3 is the positive bus-bar and is grounded, while 4 is the negative bus-bar and is preferably maintained at a negative voltage of 48 volts. The relay VR is a voltage relay and closes its contacts A and B depending upon whether the voltage across the bus-bars is below or above 48 volts. The armature is biased to maintain normally a neutral position.

The generator G and driving motor M are shown at the upper part of the drawing. A remote control switch AS connects the main supply MS to the motor M. The device ACI is an arrangement for automatically cutting-in and cutting-out the generator G to the battery 1 when the generator voltage is of sufficient value. The control of the various elements of the circuit is effected by means of a number of relays which will be fully understood when the operation of the system is described.

As arrangements of the character described are usually employed at unattended exchanges, supervisory devices are provided at a main or central exchange and are arranged to be operated upon the failure of any particular operation as will be more fully described hereinafter.

The operation of the system will now be described. When the voltage across the bus-bars falls below 46 volts the armature of the relay VR makes contact with A, closing a circuit through relay $R^4$ from positive bus-bar 3, $K^2$, contact A of relay VR, winding of $R^4$, to negative bus-bar 4. Relay $R^4$ operates and closes a circuit from positive bus-bar 3, contact 60, contacts 42 and 41, of automatic voltage regulating switch AR, relay 23 to negative bus-bar 4. Relay 23 closes the circuit of motor SM of switch AR from negative bus-bar, field winding of SM, contacts 75 and 76 of 23, alarm relay $R^6$, SM, contacts 10 and 12 of 23 to ground. The motor SM operates and rotates the regulating switch AR counter-clockwise. The cam C rotates with the brush B of the switch AR and causes the roller R to be raised so that the lever L closes the contacts 39 and 37 of switch AR. Relay 23 now receives current from earth contacts 12 and 9 of 23, 37, 39, of AR, 42 and 41 of AR, winding of 23 to bus-bar 4. The motor SM continues to rotate and the brushes continue to move until they are centered on the next contact, cutting out from the battery circuit one counter electromotive force cell of the group 2. This increases the voltage across the bus-bars 3 and 4 by the voltage of the cell cut-out, namely two volts. Should the circuit of the motor SM be not closed for any reason, the alarm relay $R^6$ is not energized. Contact 63 of this relay remains closed and an alarm signal is sent to the main exchange from ground, 12 of 23, 63 of $R^6$, alarm signal ALS in the main exchange to negative pole of main office battery.

If the increase of two volts is sufficient to bring the voltage across the bus-bars 3 and 4 to 48 volts, the armature of relay VR assumes its middle or neutral position. At the end of the step taken by the brushes the roller $r$ falls into a tooth on the cam wheel C, causing the contacts 39, 37 to be broken. Thus, the circuit of relay 23 is opened, thereby causing the opening of the circuit of the motor SM, and bringing the brushes to rest upon the contact desired. On the other hand, if the increase is not sufficient, the relay VR remains on contact A, and in spite of the opening of contact 37, 39, when the roller $r$ drops into a tooth on the cam $c$, the circuit of the relay 23 is maintained closed and the brushes of the switch AR take one more step.

When the brushes of the switch AR have been moved one or more steps in the manner described and the relay VR is maintained energized to close its contact A, thereby indicating a battery voltage of less than 46 volts, it is necessary to start the charging set in operation. Should it be required to start the charging set when the battery voltage reaches 46 volts with 0, 1 or 2 counter-electromotive force cells of the group 2 in circuit, the plug $p$ is inserted between the desired sector $S^1$, $S^2$, $S^3$ of the switch AR, and the sector 43. If the charging set is to operate under these conditions with one counter-electromotive force cell, the plug is inserted in sector $S^2$ as indicated.

When the brushes B and $b$ stand on the contact $S^2$ of the first counter-electromotive force cell, the following circuit is closed:— bus-bar 4, brushes B and $b$, $S^2$, $p$, 43, relay $R^1$, contact 59 of relay $R^4$, bus-bar 3, relay $R^4$ being operated over the A contact of relay VR. $R^1$ closes the following circuit:— 4, 26 of $R^1$, winding of relay 54 of remote control switch AS, back contact of relay $R^2$, to positive bus-bar 3. The switch AS connects the stator windings of the charging motor M to the main supply leads MS, causing the motor to start.

In the operation just described the generator G is set in operation when the voltage drops below 46 volts and the predetermined number of counter-electromotive force cells have been cut out of circuit. When, however, the battery is discharged to a predetermined proportion of its capacity, for example, 85 per cent, the starting of the charging set is brought about independently of the voltage regulating switch AR by the operation of the ampere hour meter which closes its contact X when a predetermined quantity of electricity has been drawn from the battery. When contact X closes, relay $R^7$ energizes and closes the circuit of switch AS from 4, 69 of $R^7$, AS, back of $R^2$ and $R^3$ to positive battery. Switch AS is maintained energized over a circuit from negative, 55, of coil AS, coil of AS, back of $R^2$ and $R^3$ to positive. The switch AS connects the motor to the main supply as before described.

The generator G is driven by motor M and as soon as the voltage of the generator is sufficient the automatic cut-in switch ACI closes from the generator to the battery 1. The battery voltage now increases to 48 volts and the contact A of the relay VR opens. This has no effect, however, as the circuit of the switch AS remains operated as before described under the control of the ampere hour meter AHM. The bus-bar voltage continues to rise and when it exceeds 50 volts, the relay VR causes its armature to engage contact B, whereby the following circuit is closed:—positive bar 3, $K^2$, contact B of VR, relay $R^5$, to negative. $R^5$ closes a circuit from 3, 62, 44 and 45 of AR, winding of relay 24 to negative. The circuit of the motor SM is closed through 4 field winding of SM 73 and 74 of 24 SM, relay $R^6$, contacts 72 and 70 of 24 to ground. The reversal of the current causes the motor and the brushes rotated thereby to rotate clockwise. Each step of the brushes inserts one counter-electromotive force cell in the battery discharge circuit, and the relay VR opens its contact B when the voltage across the bus-bar drops by the insertion of each cell. As the charge progresses, the voltage gradually increases and each time the contact B of relay VR is closed, a circuit is closed for relay $R^5$ which, as described causes the brushes of the switch AR to move in a clockwise direction to insert the cells 2 in the battery circuit one at a time. The contact B of relay VR will, of course, open each time the bus-bar voltage falls to 48 volts.

When it is necessary to stop the charging operation when, for example, the brush B is on the contact corresponding to the 6th electromotive force cell, the operation of the charging set G and M will be stopped provided the ampere hour meter AHM has closed its contact Y indicating a complete charge. In order to stop the charge when any particular cell of the group 2 is reached, it is necessary to insert the plug $p^1$ opposite the desired sector, as indicated.

If the plug $p^1$ be inserted at sector $T^2$, the brush $b$ upon engaging this sector, closes the following circuit:—negative, B, $b$, $T^2$, plug p¹, winding of R², 61 of R⁵, (relay R⁵ being operated over B of VR) to positive. R² energizes and locks up over its right hand winding and remains energized until its locking circuit is operated by the subsequent operation of the relay R³, which takes place when the ampere hour meter AHM closes its contact Y.

As the charging of the battery progresses the ampere hour meter AHM is operated so that at the completion of the charge the contact Y of this meter is closed, whereby a circuit is closed for relay R³ which may be traced from negative K¹, Y of AHM, winding of R³ to earth. R³ energizes and opens the circuit of AS, which thereupon releases to open the motor circuit and the locking circuit before traced through contact 55. The charging set is thus brought to rest and in slowing down, when the voltage falls below a certain amount, the automatic cut-in switch ACI disconnects the generator from the battery, thus stopping the charge.

When the generator is disconnected from the battery the voltage of each cell will fall from 2.7 volts to 2. Thus, the voltage across the bus-bar 3 and 4 will fall gradually to 48 volts. It thus becomes necessary to eliminate the cells of group 2 which have been placed in series with the battery during the charge, from this circuit one at a time. This is accomplished in the following manner:—
Each time the voltage falls below 48 volts, A of VR will be closed, thereby energizing the relay R⁴ from positive, A, R⁴ to negative. The relay R⁴ closes the circuit as before traced of SM, so that switch AR moves in a counter-clockwise direction eliminating one at a time the cells before referred to.

The contacts 41 and 42 of the switch AR are provided in order to limit the counter-clockwise motion of the switch AR and prevent the movement of this switch beyond position 1. When the switch reaches position 1 in its counter-clockwise movement, 41 and 42 are opened, and any subsequent closure of contact A of relay VR is without effect upon SM. In these circumstances, the closure of contact A of VR will cause the operation of relay R⁴ and R¹ so as to start the charging set in operation as before described.

In a similar manner the movement of the switch AR in a clockwise direction is controlled by the contact 44 and 45. These contacts are opened when the last contact in this direction is engaged and the closure of contact B is then without effect on the motor SM so that the switch AR cannot move off its last contact. When the relay VR closes contact B the relays R⁵ and R² will be energized to stop the operation of the charging set, as before described.

As the charging apparatus described is intended for use in small exchanges which are supervised from a distant main exchange, the alarm signal ALS at the distant exchange will be operated in certain circumstances, as will now be described.

A relay SR is connected in each phase of the stator of the motor M, and if one of these relays fails to operate, a circuit is closed from battery at the distant exchange, alarm signal ALS, 58 of AS, (assumed to be closed) through a back contact of relay SR to earth. ALS operates the alarm signal.

The signal is also operated when the contact 64 remains closed when switch AS is in operation, thereby indicating that the automatic cut-in switch ACI is not operated although the generator G is running.

When the reversing relay RI is operated and the relay R⁶ remains deenergized, a circuit is closed for the signal ALS, thereby indicating that the field circuit of the motor of AR is closed, but the armature circuit is open, so that SM does not rotate.

When the voltage relay VR closes either of its contacts the operation of relay R⁴, or R⁵, closes the following circuit:—positive, 59 of R⁴, or 61 of R⁵, alarm signal ALS, to battery at the main exchange. If the signal ALS remains in operation for a long time, the operator at the main exchange knows that the power apparatus at the satellite requires attention.

The normal operation of charging and discharging the battery is effected by the automatic apparatus just described. In exceptional circumstances, however, such as during an over-charge of the battery, the automatic operation may be substituted by a manual one. When this is required the switches K¹ and K² are open, thereby disconnecting the contacts of the relay VR and the ampere hour meter AHM. A switch K³ in the generator circuit is thrown to cut-out the counter-compound winding on the generator G and substitute therefor the regular shunt winding. A switch K⁴ is also provided in the motor circuit to connect the motor to the supply leads.

What is claimed is:

1. In combination, a secondary battery circuit, a motor generator set, a series of counter electromotive force cells associated with said battery, a progressively movable switch for cutting said cells in and out of said secondary battery circuit, a motor for driving the same, a voltmeter relay connected to said secondary battery, a circuit closed by said relay on a predetermined low voltage condition of said battery, means operated thereby for closing said motor circuit to cut out said cells, adjustable means on said switch, a circuit including said means closed when a particular cell is reached by said switch as the voltage drops, a central source of power, an electromagnetic switch in said circuit for connecting the motor of said set to said source, said voltmeter relay on a predetermined high voltage condition closing its alternate contact, a circuit closed thereby and controlling means for reversing the movement of said motor to cause said progressive switch to cut in said cells, an ampere hour relay in said battery circuit, and a second circuit controlling said electromagnetic switch including a contact of said ampere hour relay, a circuit including said adjustable means and closed by said progressive switch when a particular cell is reached during the charging operation for opening one of the circuits of said electromagnetic switch and a circuit including the alternate contact of said ampere hour meter closed when the battery is fully charged for opening the other circuit of said switch to disconnect the motor from said central source.

2. In combination, a secondary battery circuit, a motor generator set, a series of counter electromotive force cells associated therewith, a progressively movable switch for cutting said cells in and out of said circuit, a voltmeter relay connected to said circuit, means controlled thereby for moving said switch according to the voltage of said battery, a central source of power, an electromagnetic switch for operatively connecting the motor of said set to said source, adjustable means on said progressively movable switch, a circuit including said adjustable means and closed when a particular cell is reached by said switch for operating said electromagnetic switch, an ampere hour relay connected to said secondary battery circuit, and a circuit controlled thereby for independently operating said electromagnetic switch, and means for opening both circuits for said electromagnetic switch to disconnect said central source from said motor when the voltage and current of said secondary battery reach predetermined values.

In witness whereof, I hereunto subscribe my name this 13 day of June, A. D. 1925.

S. V. C. SCRUBY.